April 6, 1943.    J. D. CRECCA ET AL    2,315,502
SUBAQUEOUS END-WELDING DEVICE
Filed July 18, 1942
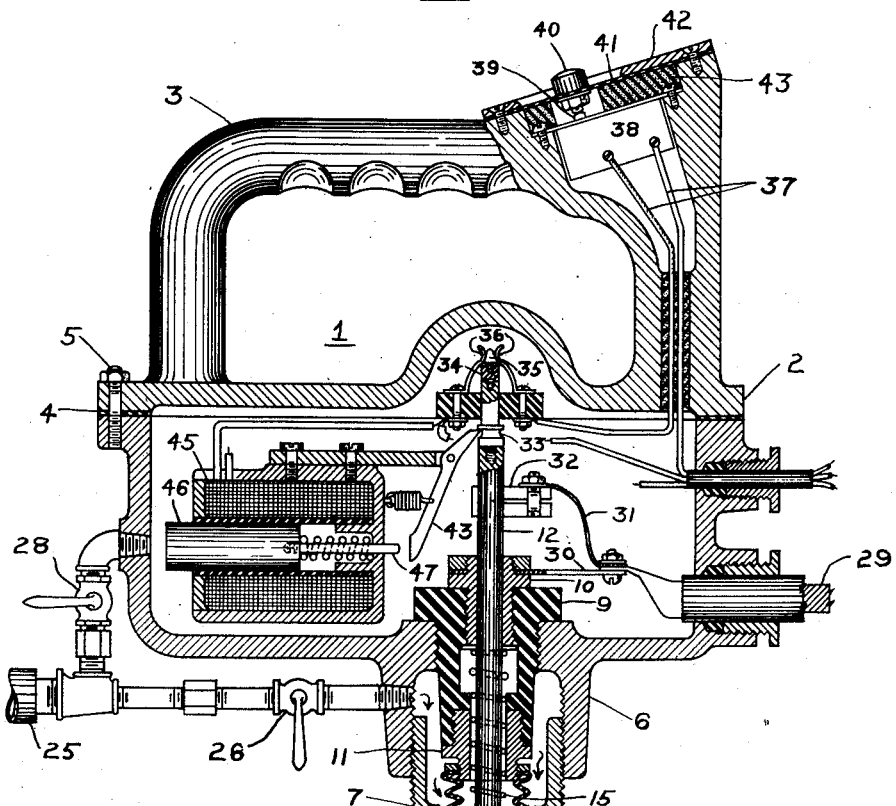
Fig. 1
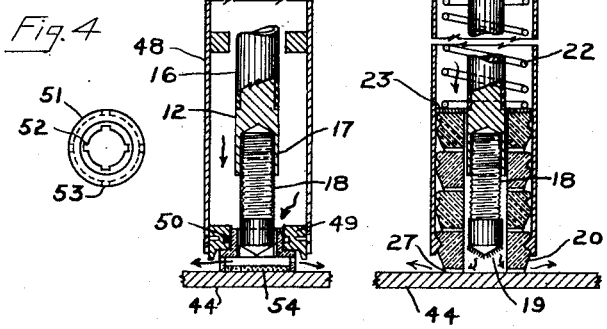
Fig. 3    Fig. 2
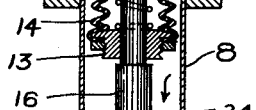
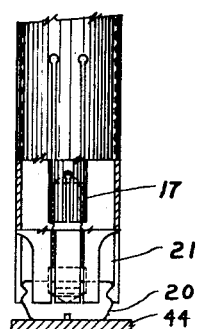
INVENTORS
JOHN D. CRECCA and
ADDISON G. BISSELL
BY
ATTORNEY Patented Apr. 6, 1943

2,315,502

UNITED STATES PATENT OFFICE 2,315,502

SUBAQUEOUS END-WELDING DEVICE

John D. Crecca, United States Navy, and Addison G. Bissell, Washington, D. C.

Application July 18, 1942, Serial No. 451,396

8 Claims. (Cl. 219—4)

(Granted under the act of March 3, 1883, as amended April 30, 1928; 370 O. G. 757)

Our invention relates to apparatus for end-welding studs, bolts and the like to another member, and more particularly to a device of that type adapted for use under water.

This apparatus is an improvement over the structure disclosed in a prior application, Serial No. 362,714, filed October 25, 1940, now U. S. Patent No. 2,307,026, issued Jan. 5, 1943.

One object of this invention is to provide a welding gun for use under water in which the movable spindle thereof is jacketed in a bellows at the point of entry of the spindle in the gun housing in order to make a watertight seal.

Another object of the invention is to provide an under-water welding gun in which electrolysis of current carrying members thereof is reduced to a minimum.

Another object is to provide a welding gun for use under water in which a gaseous fluid is admitted under pressure to the interior of the gun housing to counteract water pressure acting upon the exterior walls of the housing.

Still another object is to provide an underwater welding gun in which a gaseous fluid is directed under pressure to the area adjacent the weld junction to keep water away from the junction.

A further object of our invention is to provide an under-water welding gun in which a plurality of ferrule members may be stacked in superposed relation in the gun and fed one by one as needed into operative position over the welding junction.

These and other objects of our invention will become more apparent from the detailed description to follow and from the accompanying drawing.

In the drawing, wherein like parts are designated by like reference characters.

Fig. 1 is an elevational view partly in section of a preferred embodiment of our invention;

Fig. 2 is a view of the lower portion of the gun taken at a right angle to Fig. 1;

Fig. 3 is a modified form for the lower portion of the gun; and

Fig. 4 is a plan view of the ferrule utilized in Fig. 3.

Referring now to the drawing, a housing or body 1, which may be made of any suitable material such as metal or synthetic plastic, is in general cup-shaped and the open side thereof is closed by a cover member 2 which is provided with a handle support 3. Cover member 2 may be rendered water-tight by gasket 4 and a series of studs 5.

The lower side of the body member 1 is provided with a substantially cylindrical hollow extension 6 that is internally threaded to engage the threads on a collar 7. Attached to the collar 7 is a sleeve 8.

An insulating bushing 9 is arranged in watertight engagement with the body member 1 and has threaded into it a bearing 10 and a support collar 11.

A spindle 12 which is journaled in the bearing 10 is arranged for reciprocating movement and its function will be hereinafter explained. In order to prevent water from entering the body 1 by seepage around the spindle surface, we have provided a bellows 14 to jacket the spindle 12. One end of the bellows is secured tightly to spindle 12 by collar 13 and the other end is secured to collar 11.

A helical spring member 15 disposed over the spindle 12 and retained in compression between the bottom face of bearing member 10 and collar 13 serves to urge the spindle 12 outwardly from the body 1.

To prevent electrolysis of the spindle 12 (which carries the welding current) an insulating sheath 16 of rubber or fibre is disposed over as much of it as practical. The lowermost portion of the spindle 12 may terminate in a recess, the wall of which is slotted to constitute a chuck 17 for receiving the piece to be welded, illustrated in the present embodiment as a threaded stud 18.

Arc initiating material 19 such as, for example, iron chippings and aluminum filings, as described in U. S. Patent 2,138,025, issued November 29, 1938, may be applied to the tapered lower end of stud 18 by cement. This material initiates the arc when welding current is applied and may be confined to the immediate area of the weld junction by means of an annular ferrule 20.

Ferrule 20 also serves to prevent molten metal from splashing against and adhering to the walls of the sleeve 8.

These ferrules which may be made of porcelain or plastic will be consumed in the course of time as the studs are welded. As the welding operation is carried out under water, ready replacement of the ferrules is imperative. The manner in which we have accomplished this is readily seen from Fig. 1, wherein a plurality of the ferrules are stacked in superposed relation in the sleeve 8.

The lower end of sleeve 8 is slotted at two or more places to form a plurality of resilient fingers which are adapted to hold the lowermost ferrule in position over the welding junction. The fingers also have portions cut away as at 21 to permit the operator to grasp the ferrule with his fingers.

If desired, a second coil spring 22 may be disposed in compression between a washer 23 and shoulder 24 to urge the stack of ferrules downwardly.

Gaseous fluid such as air, or, if desired, a reducing gas such as hydrogen, may be admitted to the interior of the cylinder extension 6 from a supply pipe 25. The gas which may be controlled by a valve 26 passes downwardly through the sleeve 8, downwardly through the annular space defined by the spindle 12 or insulating sheath 16 and inside wall of the stacked ferrules 20 to the area of the weld junction. The pressure of the fluid is regulated so that it will be just sufficient to overcome the pressure of the water. This excess of pressure will be sufficient to keep the water out of the sleeve 8 and away from the immediate area of the weld. To permit the fluid to escape, the ferrules 20 may be provided with one or more ports 27.

This gaseous fluid serves three purposes: first, it prevents the water pressure from crushing the sleeve 8—secondly, by excluding all water from the interior of the hollow extension 6 and sleeve 8 electrolytic action of all current carrying members is reduced materially—and, thirdly, it keeps water away from the immediate area of the weld junction which prevents the weld from cooling too rapidly.

If welding is carried out at a great depth beneath the surface of the water when water pressures are of considerable magnitude, it may also be desirable to supply the interior of the body 1 with a gaseous fluid to offset the pressure acting on the outside surfaces thereof. This fluid may also come from supply pipe 25 and can be controlled by valve 28.

Welding current is supplied to stud 18 in chuck 17 carried by spindle 12 through a lead 29 which is connected to bearing 10 by strap 30 and also through flexible lead 31 and connecting element 32, directly to the spindle 12.

The upper end of spindle 12 carries a member 33 having a latch engaging shoulder. Insulating member 34 is secured to member 33 and carries a conductive circuit closing element 35 which serves to close a circuit between spring contacts 36—36 when in the position shown. Contacts 36—36 are in series in a control circuit 37 which also includes a switch 38 in series. Switch 38 contains a member 39 which closes the switch contacts when depressed and which is disposed to be contacted by a portion of a button 40 which extends through a waterproof flexible membrane 41 that is clamped at its edges to the handle 3 by means of a ring 42.

Between the membrane 41 and the switch 38 is disposed a compressible body member 43, which may be of sponge rubber, that prevents untimely closing of the contacts in switch 38 through depression of flexible membrane 41 by water pressure but will nevertheless yield when the operator manually presses upon button 40 and permit closing of switch 38.

When a stud 18 is inserted in chuck 17, the spindle 12 is pushed upwardly against the spring 15 to effect engagement between a spring biased latching lever 43 and the shouldered portion of member 33 to hold the spindle 12 in a "cocked" position with the control circuit closed through contacts 36—36 by contactor 35.

With arc initiating material 19 on the end of stud 18, the welding gun is positioned on the work 44 where the stud is to be welded. Sleeve 8 is then adjusted axially of the supported stud 18 until the end of the stud 18 is at the proper arc length distance from the work 44.

When the operator opens valve 26, the gaseous fluid will flow downwardly through sleeve 8 to the situs of the weld and force the water away from the welding junction.

The operator then presses button 40, control circuit 37 is thus energized and, through a relay (not shown) as is well known in this art, the welding circuit is closed to supply a potential between the bottom of stud 18 and work 44. This causes an arc to be struck from the stud to work 44 through arc initiating material 19. At the same time a timer (not shown) of conventional construction is set into operation to time the duration of the arc. After the predetermined interval for the flow of welding current, the timer connects a solenoid 45 to a source of current which energizes the solenoid 45 and draws its core 46 into the solenoid, causing pin 47 carried by core 46 to contact latching lever 43 and disengage the same from the shoulder on member 33.

When spindle 12 is unlatched, spring 15 will move it downwardly so that stud 18 is thrust into the pool of molten metal in the work 44 and the weld is completed.

A spindle 12 moves, the circuit through contacts 36—36 is broken which stops the operation of the timer and releases the relay which closes the welding circuit. Since the construction of such relays and timers and their operation are well known in this art, we have not thought it necessary to illustrate the same or further describe them.

In the modification shown in Figs. 3 and 4, the lower portion of the sleeve (now designated by reference character 48 since it is not slotted as is the structure shown in Figs. 1 and 2) is provided with a collar 49 fastened thereto by suitable means.

A recess is provided in the inside wall of collar 49 for receiving a split ring 50 for detachably holding a ferrule 51. Ferrule 51 illustrated in plan in Fig. 4 has a plurality of spaced vertical slots 52 which permits gaseous fluid after passing downwardly in the sleeve 48 to enter the weld area. The fluid then passes outwardly through horizontal slots 53.

Arc initiating material of iron and of aluminum filings compressed into a disc 54 may be inserted in the bottom opening in ferrule 51.

In conclusion, it is to be understood that the terms "subaqueous" and "water" are illustrative only and are intended to cover other liquids as well, such as oil. The term "stud" is intended to be construed broadly enough to cover any type of element to be welded in the manner described herein.

Also, it will be evident that changes in the particular embodiments of our invention as illustrated may be made without departing from the spirit and scope of our invention, and we desire it to be understood that only such limitations as are necessitated by the prior art are to be placed upon the appended claims.

The invention described herein may be manufactured and used by or for the Government of the United States of America for governmental purposes without the payment of any royalties thereon or therefor.

Having thus fully described our invention, we claim:

1. A device adapted for end-welding a stud or the like to a base member comprising a hollow body member having an opening in one wall thereof, a spindle slidably mounted through said wall opening, chuck means carried by the lower end of said spindle for holding said stud, a sleeve surrounding said spindle and extending downwardly over said stud, means carried by said sleeve and adapted to hold an expendable ferrule in protective position intermediate said stud and sleeve at the welding junction, means for initially holding said spindle in retracted position, said stud then being spaced from said base member, means for initiating a welding arc between said stud and base member, and means for subsequently extending said spindle and stud to complete the welding operation.

2. A device adapted for end-welding a stud or the like to a base member under water comprising a hollow body member having an opening in one wall thereof, a spindle slidably mounted through said wall opening, means for sealing said wall opening around said spindle, chuck means carried by the lower end of said spindle for holding said stud, a sleeve member surrounding said spindle and extending downwardly over said stud, an annular expendable ferrule intermediate said spindle and tubular member, said ferrule having a central opening therethrough for passage of said stud and disposed adjacent the welding junction, means for initially holding said spindle in retracted position, said stud then being spaced from said base member, means for initiating a welding arc between said stud and base member, means for subsequently extending said spindle and stud to complete the welding operation, and gas inlet means whereby a gaseous fluid may be directed downwardly through said sleeve member and through the central opening in said ferrule to the area adjacent the welding junction to exclude water therefrom.

3. A device adapted for end-welding a stud or the like to a base member under water comprising a hollow body member having an opening in one wall thereof, a spindle slidably mounted through said wall opening, means for sealing said wall opening around said spindle, chuck means carried by the lower end of said spindle for holding said stud, a sleeve member surrounding said spindle and extending downwardly over said stud, an annular ferrule intermediate said sleeve member and stud and disposed adjacent the welding junction, said ferrule having slots therein, means for initially holding said spindle in retracted position, said stud then being spaced from said base member, means for initiating a welding arc between said stud and base member, means for subsequently extending said spindle and stud to complete the welding operation, and gas inlet means whereby a gaseous fluid may be directed downwardly through said sleeve member and through said slots in said ferrule to the area adjacent the welding junction to exclude water therefrom.

4. A device for end welding a stud or the like to a base member under water comprising a hollow body member having an opening in one wall thereof, a spindle slidably mounted in said body member, said spindle having one end thereof projecting through said wall opening, sealing means including a bellows jacketing said spindle to render said wall opening watertight, chuck means carried by the lower end of said spindle to support said stud, means for initially holding said spindle in retracted position, said stud then being spaced from said base member, means for initiating a welding arc between said stud and base member, and means for subsequently extending said spindle and stud to complete the welding operation.

5. A device adapted for end-welding a stud or the like to a base member under water comprising a hollow body member having an opening in one wall thereof, a spindle slidably mounted through said wall opening, chuck means carried by the lower end of said spindle for holding said stud, a sleeve member surrounding said spindle and extending downwardly over said stud, means carried by said sleeve member and adapted to grip in protective position over the welding junction the lowermost of a plurality of expendable ferrules which may be stacked in said sleeve member upon said spindle and stud, means for initially holding said spindle in a retracted position, said stud then being spaced from said base member, means for initiating a welding arc between said stud and base member, and means for subsequently extending said spindle and stud to complete the welding operation.

6. A device adapted for end-welding a stud or the like to a base member under water comprising a hollow body member having an opening in one wall thereof, a spindle slidably mounted through said wall opening, chuck means carried by the lower end of said spindle for holding said stud, a sleeve member surrounding said spindle and extending downwardly over said stud, means carried by said sleeve member and adapted to grip in protective position over the welding junction the lowermost of a plurality of expendable ferrules which may be stacked in said sleeve member upon said spindle and stud, means for initially holding said spindle in a retracted position, said stud then being spaced from said base member, means for initiating a welding arc between said stud and base member, means for subsequently extending said spindle and stud to complete the welding operation, and gas inlet means whereby a gaseous fluid may be directed downwardly through said sleeve member during the welding operation to the area adjacent the welding junction to exclude water therefrom.

7. A device adapted for end-welding a stud or the like to a base member under water comprising a hollow body member having an opening in one wall thereof, a spindle slidably mounted through said wall opening, means including a bellows jacketing said spindle to seal the wall opening around said spindle, chuck means carried by the lower end of said spindle for holding said stud, a sleeve member surrounding said spindle and extending downwardly over said stud, means carried by said sleeve member and adapted to grip in protective position over the welding junction the lowermost of a plurality of expendable ferrules which may be stacked in said sleeve member upon said spindle and stud, means for initially holding said spindle in retracted position, said stud then being spaced from said base member, means for initiating a welding arc between said stud and base member, means for subsequently extending said spindle and stud to complete the welding operation, and gas inlet means whereby a gaseous fluid may be directed downwardly through said sleeve member during the welding operation to the area adjacent the welding junction to exclude water therefrom.

8. A device adapted for end-welding a stud or the like to a base member under water comprising a hollow body member having an opening in one wall thereof, a spindle slidably mounted through said wall opening, means including a bellows jacketing said spindle to seal said wall opening around said spindle, chuck means carried by the lower end of said spindle for holding said stud, resilient means acting upon said spindle to urge said spindle outwardly of said body member, a sleeve surrounding said spindle and extending downwardly over said stud means for adjusting said sleeve axially of said spindle, means carried by the lower end of said sleeve and adapted to grip in protective position over the welding junction the lowermost of a plurality of expendable ferrules which may be stacked in said sleeve upon said spindle and stud, resilient means urging said stack of ferrules downwardly in said sleeve, means for holding said spindle in retracted position, said stud then being spaced from said base member, means for initiating a welding arc between said stud and base member, means including said first mentioned resilient means for causing said spindle and stud to be subsequently extended to complete the welding operation, and gas inlet means whereby a gaseous fluid may be directed downwardly through said sleeve during the welding operation to the area adjacent the welding junction to exclude water therefrom.

JOHN D. CRECCA.
ADDISON G. RUSSELL.